United States Patent [19]
Smars et al.

[11] 3,869,616
[45] Mar. 4, 1975

[54] REACTOR FOR PLASMA-CHEMICAL PROCESSES

[75] Inventors: Erik Smars, Rimbo; Palne Mogensen, Jarfalla; Mats J. Kaij, Solna, all of Sweden

[73] Assignee: AGA Aktiebolag, Lidingo, Sweden

[22] Filed: Oct. 9, 1973

[21] Appl. No.: 404,658

[30] Foreign Application Priority Data
Oct. 6, 1972 Sweden............................ 12902/72

[52] U.S. Cl.................. 250/547, 204/171, 250/530, 250/542
[51] Int. Cl......... C22d 7/08, C07c 3/24, B01k 1/00
[58] Field of Search ............ 204/171; 250/531, 542, 250/547

[56] References Cited
UNITED STATES PATENTS

| | | |
|---|---|---|
| 3,185,638 | 5/1965 | Cremer et al....................... 250/531 |
| 3,396,098 | 8/1968 | Manion et al....................... 250/531 |
| 3,516,921 | 6/1970 | Manion et al....................... 250/530 |
| 3,522,015 | 7/1970 | Maniero et al. ...................... 23/277 |
| 3,558,286 | 1/1971 | Gourdine.............................. 23/288 |
| 3,674,666 | 7/1972 | Foster................................ 204/164 |

*Primary Examiner*—John H. Mack
*Assistant Examiner*—Aaron Weisstuch
*Attorney, Agent, or Firm*—Lerner, David, Littenberg & Samuel

[57] ABSTRACT

A reactor for plasma-chemical processes is disclosed, including a tubular envelope around the arc passing between an anode and cathode within the reactor. Provision is also made for the forcing of a plasma gas through the arc.

10 Claims, 4 Drawing Figures

REACTOR FOR PLASMA-CHEMICAL PROCESSES

FIELD OF THE INVENTION

The present invention relates to a reactor for plasma-chemical processes such as for example the cracking of hydrocarbons for the manufacture of for example acetylene, the reactor comprising a cathode and an anode between which electrodes burn an arc at the same time as a gas, such as for example hydrogen or a suitable gas mixture, is forced through the arc.

BACKGROUND OF THE INVENTION

In a reactor for plasma-chemical processes it is important that the arc developed between cathode and anode should be mainly situated along the center line of the arc chamber. Otherwise a so-called double arc can occur, which means that the arc instead of burning directly between the anode and the cathode, burns from the cathode to any one or more points on the walls of the arc chamber and from these to the cathode with the detrimental effects inherent in this.

It is the object of the present invention therefore to provide a reactor set-up wherein this so-called double arc does not occur but where the arc can be kept stable along the whole center axis between the cathode and the anode.

SUMMARY OF THE INVENTION

The reactor is characterized mainly in that between the cathode and the anode mutually insulated segments of heat-resistant material are arranged, which are so constructed that they form a tubular envelope around the arc and that between the cathode and the anode respectively and the segment situated closest to them, and between each segment, ducts for the introduction of additional gas into the arc chamber are arranged. The possibilities of stabilizing the arc are improved if the ducts are provided with devices through which the gas is blown tangentially into the arc chamber. The rotation effect upon the arc achieved hereby can be further increased in that around the anode area a magnetic field with a suitable orientation is applied. In addition a rotation of the root of the arc on the anode is achieved, as a result of which the wear on the electrode is appreciably reduced.

BRIEF DESCRIPTION OF THE DRAWINGS

The invention will now be described in detail in connection with the enclosed drawings.

DETAILED DESCRIPTION

Figure 1:
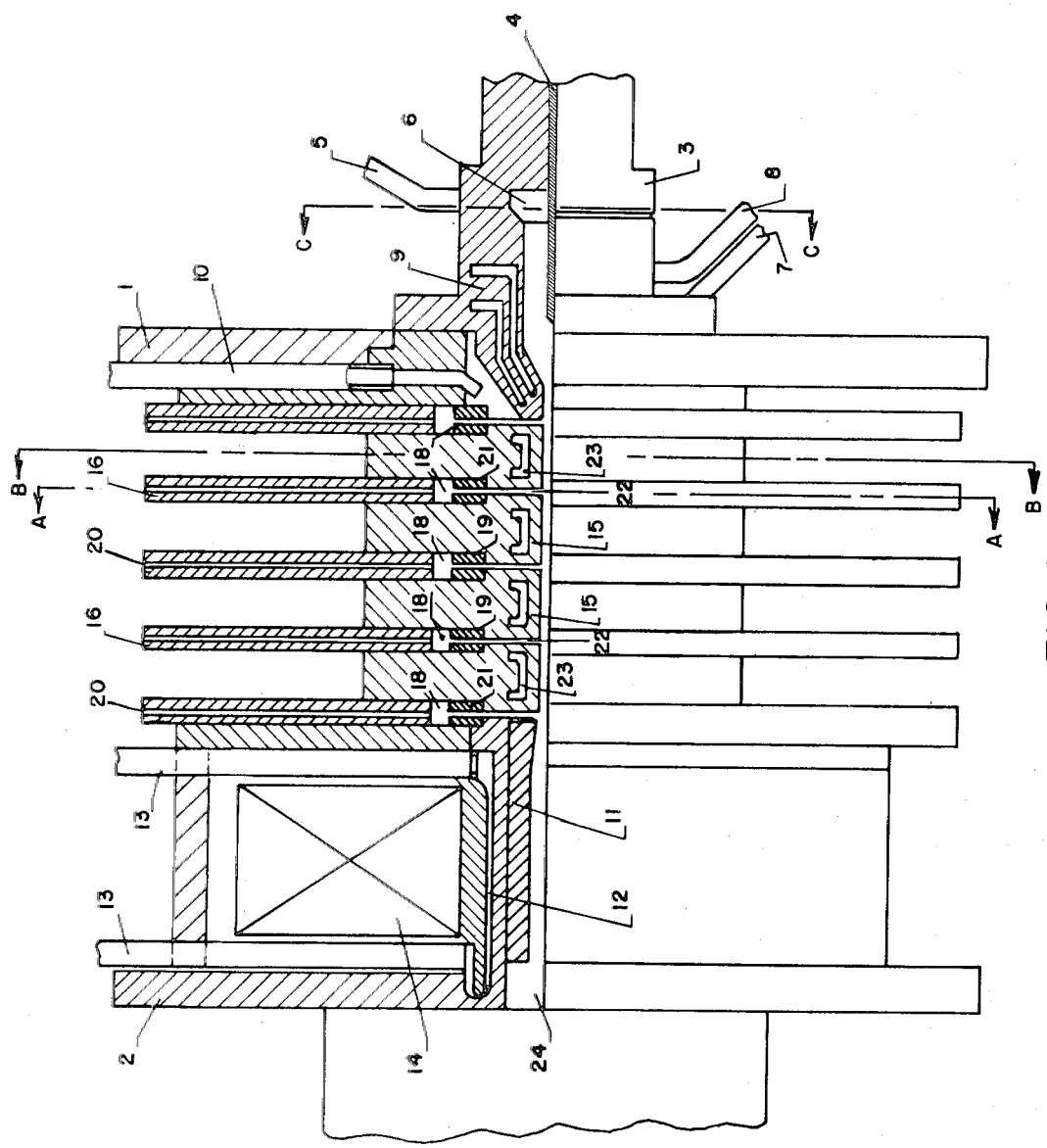
FIG. 1 shows an embodiment of the reactor seen half in section.
Figures 2A, 2B, 2C:
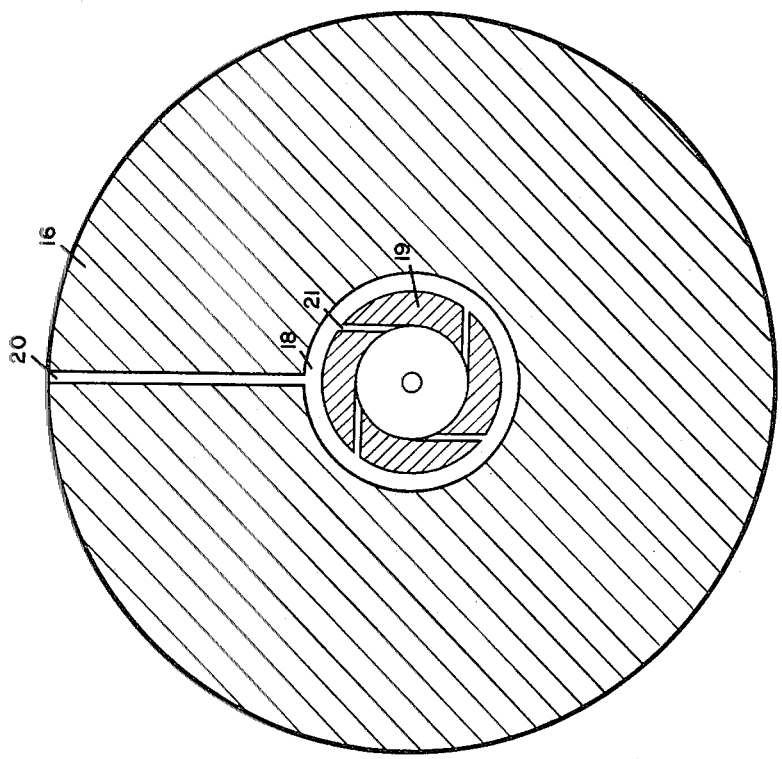
FIGS. 2A, 2B, and 2C show crosssections of the reactor, taken at A—A, B—B, and C—C of FIG. 1.

The reactor comprises two end pieces 1 and 2 at which are arranged the cathode and the anode respectively. The cathode consists of the electrode 4 in an electrode holder 3. This is provided with cooling ducts 9 in a conventional manner, which are fed from the cooling water lines 7 and 8. The plasma gas is supplied to the holder 3 via a gas line 5. The gas is introduced into the burner at 6 in the rear portion of the cathode. The area around the front part of the electrode holder 3 is cooled with the help of cooling ducts 10. At the opposite end piece 2 is arranged the anode 11. In the embodiment shown it is tubular. The anode is cooled by means of the cooling duct 12 which is in connection with the cooling water ducts 13 and 13'. Around the anode is arranged a magnet coil 14 which generates a magnetic field in the area of the anode.

Between the electrode holder and the anode are arranged a number of annular segments 15 of an electrically conducting heat-resistant material. The segments 15 form together a tubular envelope around the space of the arc between the cathode and the anode. Between the segments are placed discs 16 of insulating material. In the discs are provided radial ducts 20 for the supply of plasma gas. Nearer the arc are placed annular discs 19 so formed that the plasma gas is blown in against the arc with tangential velocity component in the space 22 between the segments. Between the discs 16 and 19 is a chamber 18, wherein the gas fed through the ducts 20 is distributed over the ducts 21. In the part of the segments 15 situated towards the arc are arranged ducts 23 for the cooling of the segments. As a cooling medium in these ducts it is possible to use for example the same gas as that fed into the ducts 20.

After an arc has been established between the cathode 4 and the anode 11, and the plasma gas has been fed into the electrode holder, an arc plasma is obtained between cathode and anode. The plasma gas may consist for example of hydrogen or any suitable gas mixture. Additional plasma gas is introduced later through the ducts 20 and 21 into the reactor. By virtue of the gas being blown in with tangential velocity component into the arc space a vorticity stabilization of the arc is obtained. This stabilization is obtained along the axis of the reactor between cathode and anode. The rotational effect on the arc which is achieved through the gas being blown in tangentially can be increased further with the help of the magnet coil 14 in that the latter is allowed to generate a magnetic field around the anode with suitable orientation.

By means of the construction of the reactor described an effective stabilization of the arc is achieved as a result of which the risk of a so-called double arc is eliminated. Furthermore it is possible, in addition to the gas supplied through the electrode holder to supply further gas to the arc plasma so that the plasma jet which is blown out through the duct 24 at the anode obtains optimum gas content. Moreover, the striking of the arc between the cathode and the anode is facilitated owing to the presence of the electrically conducting segments 15. These serve in fact as intermediate electrodes in the striking procedure, with the arc being formed successively from the cathode by way of the intermediate electrodes up to the anode.

The reactor is not limited to the embodiment shown in the foregoing but variations in different parts are fully conceivable within the framework of the invention. Thus, e.g., the dimensions and design of the segments 15 may be varied and likewise the arrangement of the cooling ducts. Furthermore the annular discs 19 and the injection ducts 21 in the same may be designed in a different manner. Furthermore the anode and the magnet coil around the same and the cathode may be given a different construction. Furthermore it may be mentioned that there is nothing to prevent the electrodes from changing places in the reactor. The cathode may then be given such a shape that it can also be surrounded by a magnet coil.

What I claim is:

1. A reactor for plasma-chemical process comprising;

a pair of electrodes for the disposition of an arc therebetween;

means for the injection of a plasma gas tangentially to said arc so that said arc is stabilized along a center line connecting said electrodes;

a plurality of annular segments comprising electrically conducting heat resistant material defining an arc path between said electrodes, thereby forming a tubular envelope surrounding said stabilized arc therebetween; and a plurality of annular discs of electrically insulating material disposed alternatingly with said annular segments.

2. The reactor of claim 1 wherein said means for the injection of a plasma gas comprises duct means associated with said annular discs of insulating material.

3. The reactor of claim 2 wherein said means for the injection of a plasma gas includes an annular disc radially disposed between said arc path and said discs of insulating material for the distribution of said plasma gas to said duct means.

4. The reactor of claim 1 wherein said annular segments includes cooling means for the circulation of a cooling medium therethrough.

5. A reactor for plasma-chemical processes comprising:

a pair of electrodes for the disposition of an arc therebetween;

a plurality of annular segments of electrically conductive heat resistant material between said pair of electrodes; and a plurality of annular discs of insulating material disposed alternatingly with said annular segments, so that a stabilized arc may be maintained along said arc path between said electrodes.

6. The reactor of claim 5 including means for the injection of a plasma gas tangentially to said arc so that said arc is stabilized along said arc path.

7. The reactor of claim 6 wherein said means for the injection of a plasma gas comprises duct means associated with said annular discs of insulating material.

8. The reactor of claim 7 wherein said means for the injection of a plasma gas includes an annular disc radially disposed between said arc path and said discs of insulating material for the distribution of said plasma gas to said duct means.

9. The reactor of claim 5 wherein said annular segments include cooling means for the circulation of a cooling medium therethrough.

10. The reactor of claim 1 including magnet means for the generation of a magnetic field around at least one of said electrodes, so that said arc is further stabilized along said center line connecting said electrodes.

* * * * *